United States Patent [19]

Kobori et al.

[11] 4,128,321

[45] Dec. 5, 1978

[54] PENTAGONAL PRISM AND RELATED OPTICAL STRUCTURES FOR SINGLE LENS REFLEX CAMERAS

[75] Inventors: Toshio Kobori, Sakai; Isamu Uchida, Kawachinagano, both of Japan

[73] Assignee: Minolta Camera Kabushiki Kaisha, Osaka, Japan

[21] Appl. No.: 763,680

[22] Filed: Jan. 12, 1977

[30] Foreign Application Priority Data

Jan. 22, 1976 [JP] Japan ................................ 51-6412

[51] Int. Cl.² .................. G03B 7/08; G03B 13/08
[52] U.S. Cl. .......................... 354/23 R; 354/59; 354/155; 354/225
[58] Field of Search ............ 354/23 R, 53-56, 354/59, 152, 155, 219, 224, 225; 350/204, 287

[56] References Cited

U.S. PATENT DOCUMENTS

| 3,760,700 | 9/1973 | Trankner et al. | 354/155 X |
|---|---|---|---|
| 3,840,298 | 10/1974 | Okuno | 354/155 |
| 3,952,321 | 4/1976 | Matui | 354/155 X |
| 3,962,710 | 6/1976 | Okuno et al. | 354/155 X |

FOREIGN PATENT DOCUMENTS

50419 9/1966 German Democratic Rep. ..... 354/155

*Primary Examiner*—John Gonzales
*Attorney, Agent, or Firm*—Watson, Cole, Grindle & Watson

[57] ABSTRACT

A pentagonal prism holder for holding a pentagonal prism in horizontal and vertical directions is made of a transparent plastic material and at least a portion of the prism holder is formed as an element or elements of an auxiliary or supplemental optical system or a finder optical system. The auxiliary or supplemental optical system may be one that indicates photographic information in the finder view field, an optical system for photometry, an optical system for preventing a ghost from being observed in a viewfinder, or an optical system for preventing undesirable or stray light passing through an ocular lens from entering into the pentagonal prism. The element of the finder optical system may be a condenser lens or an ocular lens.

14 Claims, 15 Drawing Figures

PENTAGONAL PRISM AND RELATED OPTICAL STRUCTURES FOR SINGLE LENS REFLEX CAMERAS

BACKGROUND OF THE INVENTION

This invention relates to pentagonal prisms and related optical systems for single lens reflex cameras.

Recently, single lens reflex cameras are being equipped with a variety of auxiliary optical systems operable in association with a finder optical system including a pentagonal prism. Typical auxiliary optical systems are, for example, an indicating optical system for indicating within a finder view field picture-taking information marked on a lens barrel as well as picture-taking information provided within the camera body; a light measuring optical system for directing light transmitted through an objective lens to a light receiving element; and a stray light eliminating optical system for shutting out ghosts or light which is inversely incident through an ocular lens.

It has been customary to use a holding member for attaching such an auxiliary optical system to a camera body. Such structure has the following disadvantages:

(I) The use of a holding member for supporting an individual optical system results in increased manufacturing costs and requires a large space.

(II) Foreign matter, such as dust, is admitted into the auxiliary optical system or between the pentagonal prism and the auxiliary optical system.

(III) It is difficult to make adjustment of the relative position between the pentagonal prism and the auxiliary optical system.

Meanwhile, it has been proposed that an individual element in an auxiliary optical system, for example, a prism, be molded of plastic. This method presents another difficulty in that, because the individual element to be molded is small, a smooth molten plastic flow cannot be achieved upon molding, resulting in failure to produce an element of high precision and uniform in quality.

In the vicinity of the pentagonal prism, on the other hand, are provided optical elements, such as a condenser lens and an ocular lens, constituting a finder optical system, besides the auxiliary optical system. The same difficulties as in the case of the auxiliary optical system are also experienced in supporting these optical elements and in the positional adjustment of these elements relative to the pentagonal prism.

Japanese Utility Model Application No. 46-76297, which was laid open to public inspection on Apr. 21, 1973 discloses a single lens reflex camera having a device for indicating photographic information in a viewfinder, which device may avoid the above described disadvantages (I) and (II). More particularly, in the device, the frame on which a pentagonal prism is mounted is made of a transparent plastic resin and includes a portion which serves as an optical element to introduce light bearing photographic information or light from an indicating lamp to the pentagonal prism through the lower light incident surface thereof. This construction requires no means for holding the optical element and prevents foreign matter, such as dust, from entering between the optical element and the pentagonal prism. However, since the frame is so adapted that the pentagonal prism is only mounted thereon, i.e., the frame has no means for holding the pentagonal prism in the horizontal direction, adjustment is required to determine the relative position of the optical element with respect to the pentagonal prism in the horizontal direction, and thus the device will still have disadvantage (III).

SUMMARY OF THE INVENTION

It is, accordingly, an object of the present invention to provide a pentagonal prism and related optical structure for a single lens reflex camera, which camera will not have the above described disadvantages (I), (II) and (III).

Another object of the present invention is to provide a pentagonal prism and related optical structure for a single lens reflex camera, in which camera, to avoid all of the above described disadvantages (I), (II) and (III), a pentagonal prism holder for holding the pentagonal prism in the horizontal and vertical directions has as a part thereof an element or elements of an auxiliary or supplemental optical system or an element of a finder optical system other than the pentagonal prism.

To accomplish these objects, the pentagonal prism and related optical structure of the present invention is provided with a pentagonal prism holder made of a transparent plastic material. The pentagonal prism holder has as a part thereof means for holding a pentagonal prism in a horizontal and vertical direction and at least one optical element of an auxiliary or supplemental optical system or an element of a finder optical system other than the pentagonal prism. The auxiliary or supplemental optical system may be an optical system for indicating photographic information in the finder view field, i.e., at the outside or inside of the finder image, an optical system for photometry, an optical system for preventing a ghost from being observed in a viewfinder, or an optical system for preventing undesirable or stray light passed through an ocular lens from entering into the pentagonal prism. The element of the finder optical system may be a condenser lens or an ocular lens. In preferred embodiments of the present invention, the element of the auxiliary or supplemental optical system or the finder optical system is formed on either of the holding means or both of the holding means.

The above described construction of the present invention requires no particular means for holding the optical element and prevents foreign matter, such as dust, from entering between the optical element and the pentagonal prism. Furthermore the construction of the present invention requires no adjustment of the relative position of the optical element with respect to the pentagonal prism in the horizontal and vertical directions because not only the optical element but also both of the holding means are formed on the pentagonal prism holder.

These and other objects and features of the present invention will become more apparent from the following description taken in connection with the accompanying drawings.

DETAILED DESCRIPTION OF PREFERRED EMBODIMENTS

FIGS. 1 through 5 show embodiments in which part of an indicating optical system is integrally formed with a holding frame for a pentagonal prism, the aforesaid indicating optical system being adapted to indicate within a finder view field picture-taking information marked on a lens barrel.

Figure 1:
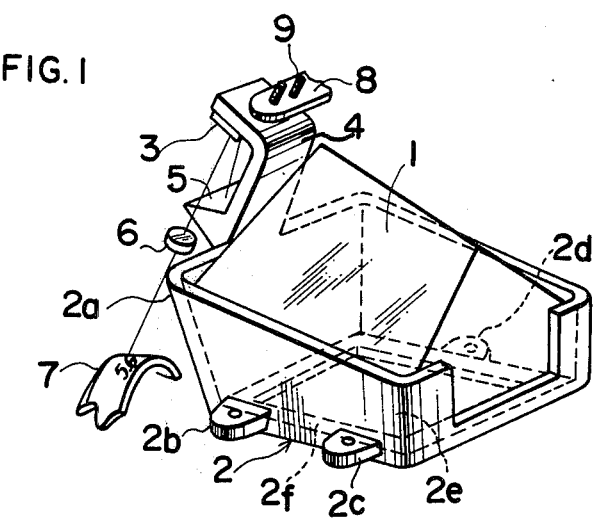
FIG. 1 is a perspective view of an embodiment of the present invention, in which a pentagonal prism holder is provided with an element of an optical system for indicating in the finder view field photographic information disposed on a lens barrel.

Referring first to FIG. 1, pentagonal prism 1 is retained by holding frame 2, which frame is formed integrally with arm 4 for supporting mirror 3 and prism 5. Holding frame 2 is made of a transparent plastic material such as acryl resin, methyl methacryl resin or styrol resin. Prism 5 is positioned in the upper portion of front wall 2a of the holding frame, which wall contacts the front reflecting surface of pentagonal prism 1. Prism 5 constitutes, in combination with mirror 3 and concave lens 6 provided for diopter compensation and magnification setting, an indicating optical system for indicating within the finder view field the predetermined aperture value on diaphragm setting ring 7 fitted on a lens barrel. With this arrangement, the diaphragm value is indicated in the upper portion of the image field within the finder view field. Plate 8 adjusts the inclination of mirror 3. When screws 9 are tightened, mirror support arm 4 is pressed by adjusting plate 8 to be deflected, so that the inclination of mirror 3 is varied.

Holding frame 2 is formed on its peripheral side walls with a plurality of attaching lugs 2b, 2c and 2d having screw holes, so that frame 2 may be attached to a camera body by threading screws (not shown) into the respective screw holes. Holding frame 2 has bottom wall 2f having opening 2e, through which the main light flux from the finder is incident on the lower light incident surface of pentagonal prism 1.

With this arrangement, by simply inserting pentagonal prism 1 in holding frame 2 from above, the pentagonal prism may be set for its positions in the vertical, and horizontal directions, and hence for a relative position of prism 5 or mirror 3 with respect to pentagonal prism 1, thus dispensing with any positional adjustment of prism 5 and mirror 3. Holding frame 2 also serves as a support for prism 5, thus reducing the number of parts, as compared with the prior art where a support member for prism 5 is provided separately. This affords a reduction in the manufacturing cost as well as compactness in the size of the camera. Furthermore, the thickness of a peripheral portion of prism 5 which requires high surface precision is increased by the thickness of holding frame 2. This allows smooth molten plastic flow, upon molding, with the improvements in surface precision or uniformity in quality of prism 5 as compared with prism 5 molded separately.

Figure 2:
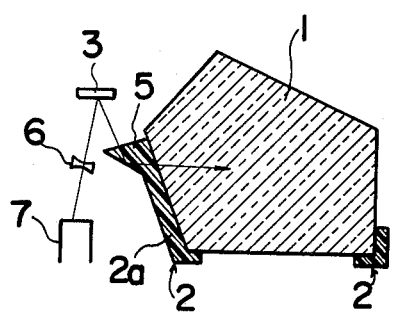
FIGS. 2 to 5 are cross-sectional views of modifications of the embodiment shown in FIG. 1.
Figure 3:
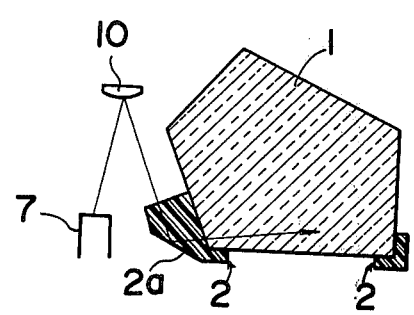

FIGS. 2 and 3 show modifications of the embodiment of FIG. 1, wherein front wall 2a of holding frame 2, which contacts the front reflecting surface of pentagonal prism 1 and prism 5, are formed integrally with each other, and part of the front reflecting surface is made transparent, so that light from the diaphragm setting ring 7 may be incident through the transparent portion onto pentagonal prism 1. These embodiments advantageously prevent admission of dust between front wall 2a of holding frame 2 and prism 5. In the embodiment of FIG. 3, mirror 3 and concave lens 6 are replaced by a single convex mirror 10.

Figure 4:
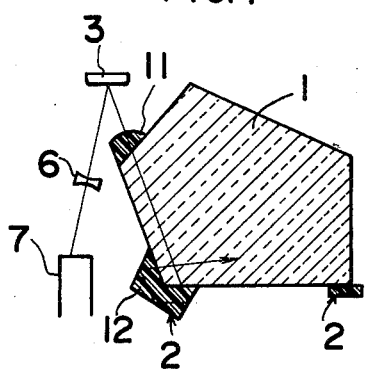

FIG. 4 shows a further modification, wherein front wall 2a of holding frame 2 is divided into two portions, i.e., a portion contacting the front upper surface of pentagonal prism 1, and a portion contacting the front reflecting surface and lower light incident surface of pentagonal prism 1. The former portion is formed by convex lens 11, and the latter portion is formed by prism 12. In this embodiment, those portions of the front upper surface and front reflecting surface of pentagonal prism 1, which contact holding frame 2, are transparent, so that light coming from diaphragm setting ring 7 through concave lens 6 is reflected onto mirror 3, then past convex lens 11 and then through pentagonal prism 1, and eventually incident on prism 12. Light entering prism 12 is subjected to total reflection three times as seen in FIG. 4 and again incident on pentagonal prism 1. Convex lens 11 is provided for maintaining a negative power as a whole as well as for diopter compensation, and convex lens 11 and prism 12 are integral with a not shown portion of front wall 2a of holding frame 2.

Figure 5:
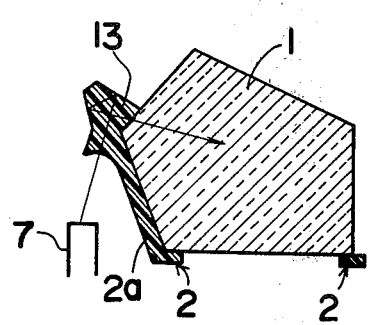

FIG. 5 shows a still further modification, wherein all of the optical elements constituting the indicating optical system are formed as one block 13 in the upper portion of front wall 2a of holding frame 2. Light from diaphragm setting ring 7 is incident on a concave surface of block 13, then reflected twice on the reflecting surfaces of the block, to eventually enter through the transparent portion of the front upper surface of the pentagonal prism into pentagonal prism 1. In this embodiment, all optical elements are formed integrally with holding frame 2. Thus, this embodiment is superior to the preceding embodiments from the viewpoint of positional adjustment of the optical elements.

In the embodiments shown in FIGS. 4 and 5, the optical elements contacting the front upper surface of pentagonal prism 1 are formed integrally with holding frame 2, while the rear wall of holding frame 2 is omitted, so as to afford ease of insertion of pentagonal prism 1 into holding frame 2.

Figure 6:
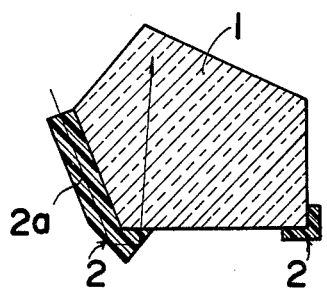
FIG. 6 is a cross-sectional view of an embodiment of the present invention, in which a pentagonal prism holder is provided with an element of an optical system for indicating in the finder view field photographic information disposed in a camera body.
Figure 7:
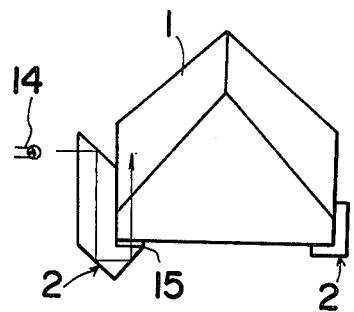
FIG. 7 is a rear view of a modification of the embodiment shown in FIG. 6.
Figure 8:
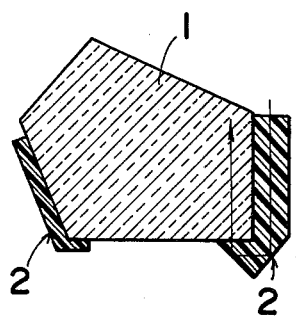
FIG. 8 is a cross-sectional view of another modification of the embodiment shown in FIG. 6.

FIGS. 6 through 8 show embodiments in which optical elements in the indicating optical system disposed within a camera body for indicating picture-taking information in the finder view field are formed integrally with the holding frame for the pentagonal prism.

In the embodiment of FIG. 6, front wall 2a of holding frame 2 functions as a light guide for guiding light from an information source (not shown) disposed thereabove. The light transmitted through the light guide portion is reflected on the reflecting surfaces provided on the front and bottom walls of the holding frame and then incident on the lower light incident surface of pentagonal prism 1.

FIG. 7 shows an embodiment, in which the instant invention is applied to an indicating optical system for indicating picture-taking information in the side portion of the image field within the finder view field. In this embodiment, one side wall of holding frame 2 functions as a light guide, so that light from lamp 14 is reflected three times on the reflecting surfaces formed on the aforesaid side wall and the bottom wall of frame 2, then passes through transparent indicating plate 15 sandwiched between pentagonal prism 1 and a bottom wall of the holding frame, and is incident on the surface of pentagonal prism 1. The picture-taking information represented by characters or the like on indicating plate 15, in general, are seen illuminated by lamp 14. Since indicating plate 15 in this embodiment is sandwiched between pentagonal prism and holding frame 2, dust or other foreign matter does not adhere to the indicating plate.

In the embodiment shown in FIG. 8, the rear wall of holding frame 2 functions as a light guide, so that light from the information source (not shown) disposed above the rear portion of pentagonal prism 1 may be reflected on the reflecting surfaces provided on the rear and bottom walls of holding frame 2 and then may be incident on the lower light incident surface of pentagonal prism 1.

Figure 9:
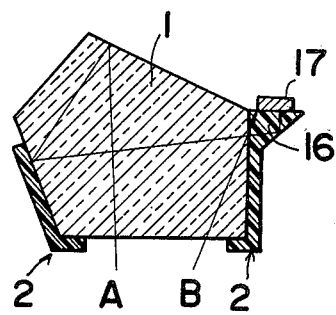
FIGS. 9 and 10 are cross-sectional views of embodiments of the present invention, in which a pentagonal prism holder is provided with an element of an optical system for photometry.
Figure 10:
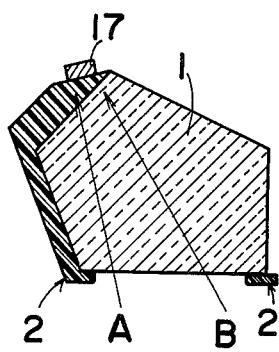

FIGS. 9 and 10 show embodiments, in which optical elements of the light measuring optical system for guiding light from an object being photographed to a light receiving element are formed integrally with holding frame 2.

In the embodiment of FIG. 9, block 16 is formed integrally with the upper portion of the rear wall of holding frame 2, on which block is disposed light receiving element 17. Thus, light flux A from the front portion of a focussing plate (not shown) is reflected on the roof surfaces and front reflecting surface of pentagonal prism 1, then incident on block 16 to be reflected onto the reflecting surface formed on the rear portion of the block, and enters light receiving element 17. Light flux B from the rear portion of the focussing plate will advance linearly through pentagonal prism 1 and the block 16 in the manner shown and enter the light receiving element 17. The block 16 in this embodiment functions as a support member for the light receiving element 17 as well.

In the embodiment of FIG. 10, the front wall of holding frame 2 extends along the front upper surface of pentagonal prism 1, and this extended portion functions as a light guide for orienting light fluxes A and B from the front and rear portions of a focussing plate towards light receiving element 17 disposed on top of the extended portion.

Figure 11:
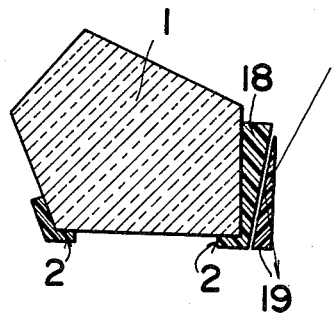
FIG. 11 is a cross-sectional view of an embodiment of the present invention, in which a pentagonal prism holder is provided with an element of an optical system for preventing undesirable or stray light from entering a pentagonal prism.
Figure 12:
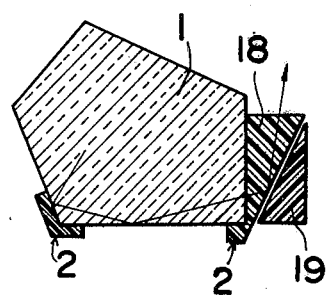
FIG. 12 is a cross-sectional view of an embodiment of the present invention, in which a pentagonal prism holder is provided with an element of an optical system for preventing a ghost from being observed in the finder view field.

FIGS. 11 and 12 show embodiments wherein optical elements of the so-called undesirable or stray light eliminating optical system are formed integrally with holding frame 2 for supporting the pentagonal prism.

In the embodiment of FIG. 11, the rear wall of holding frame 2 is given a slant surface on one side, so that prism 18 may be provided. Wedge-shaped prism 19 supported by a support member (not shown) is disposed in opposing relation to the rear surface of prism 18, with a small gap left therebetween. The light coming obliquely through an ocular lens (not shown) from above is incident on the prism 19 from the reverse direction and subjected to the total reflection on the slant surface of prism 10, thereby being oriented downwards, without being incident on pentagonal prism 1. To the extent that admission of inversely incident light alone is prevented, a single prism 19 can achieve the object, but lack of prism 18 causes a deviation and hence coloring of the main light flux from pentagonal prism 1. Prism 18 is one of the auxiliary optical elements which is essential to the inversely incident light eliminating optical system.

In the inversely incident light eliminating optical system of the prior art, the holding frame for a pentagonal prism is interposed between prism 18 and the pentagonal prism. In this embodiment, however, prism 18 is formed as part of the holding frame. This contributes to reducing the length of the camera (in the front and rear directions) by the thickness of the holding frame.

The embodiment of FIG. 12 is the same in construction as that of FIG. 11, with the exception that the inclination of the slanted opposing surfaces of prisms 18 and 19 are less than those in FIG. 11. Prisms 18 and 19 in FIG. 12 constitute a ghost-light eliminating optical system. The ghost-light is subjected to the total reflection on the slant surface of prism 18 as seen in FIG. 12, to be oriented upwards, but without entering the ocular lens (not shown).

Figure 13:
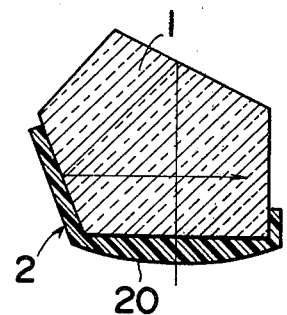
FIGS. 13 to 15 are cross-sectional views of embodiments of the present invention, in which a pentagonal prism holder is provided with an element of a finder optical system other than a pentagonal prism.
Figure 14:
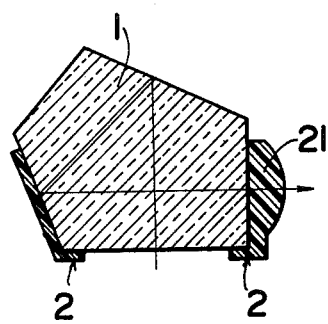
Figure 15:
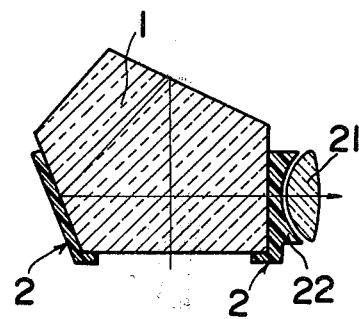

FIGS. 1 through 12 show embodiments, in which the instant invention is applied to an auxiliary optical system associated with a finder optical system. FIGS. 13 through 15 show embodiments, in which part of the optical elements other than the pentagonal prism constituting the finder optical system itself are formed integrally with a holding frame for a pentagonal prism.

In FIG. 13, condenser lens 20 is formed in the bottom wall of holding frame 2. In this embodiment, there is omitted the bottom wall of the holding frame which is interposed between the pentagonal prism and the condenser lens in the prior art. This yields another advantage, in addition to the advantages described, in that space is saved in the amount of the thickness of the holding frame, thus providing a low profile of the camera.

FIG. 14 shows an embodiment in which ocular lens 21 is formed integrally with the rear wall of holding frame 2. FIG. 15 shows an embodiment in which concave lens 22 for use in aberration compensation is formed integrally with the rear wall of holding frame 2, and ocular lens 21 is disposed behind the aberration compensating concave lens. In these embodiments, the length of the camera (in the front and rear direction) is reduced by the thickness of the holding frame for the pentagonal prism, as in the embodiments of FIGS. 11 and 12.

What is claimed is:
1. In a single lens reflex camera having a pentagonal prism, an auxiliary optical system comprising:
  at least one light reflecting optical element coacting with and disposed adjacent to said pentagonal prism; and
  a holder made of a transparent plastic material and including as an integral part thereof said light reflecting optical element, said holder holding said pentagonal prism in the horizontal direction and in the vertical direction.

2. In a single lens reflex camera as in claim 1, further comprising light responsive means, wherein said auxiliary optical system is an optical system for photometry and said light reflecting optical element reflects light from an object passed through said pentagonal prism to said light responsive means.

3. In a single lens reflex camera as in claim 1, further comprising a lens barrel having a photographic information source thereon, wherein said auxiliary optical system is an optical system for introducing light from said information source to said pentagonal prism for indication of photographic information in the finder view field, said light reflecting optical element reflecting light from said information source to said pentagonal prism.

4. In a single lens reflex camera as in claim 3, wherein said pentagonal prism includes a front reflecting surface and said holder includes a portion extending along said front reflecting surface and including said light reflecting optical element, and a part of said front reflecting surface being transparent to permit the light from said information source reflected by said light reflecting optical element to enter into said pentagonal prism.

5. In a single lens reflex camera as in claim 4, wherein said portion includes a light exit surface on said transparent part, a light reflecting surface and a light incident surface, and said optical system further includes a reflecting mirror for reflecting the light from said information source to said light incident surface so that said light reflected at said reflecting mirror after passing through said light incident surface is reflected at said reflecting surface and emerges from said light exit surface to enter into said pentagonal prism through said transparent part.

6. In a single lens reflex camera as in claim 5, wherein said reflecting mirror is mounted on said holder.

7. In a single lens reflex camera as in claim 3, wherein said pentagonal prism includes an upper front surface and said holder includes a portion extending along said upper front surface and including said light reflecting optical element, and a part of said upper front surface is made transparent to permit said light from said information source reflected by said light reflecting element to enter into said pentagonal prism.

8. In a single lens reflex camera as in claim 7, wherein said portion includes a light exit surface on said transparent part, and a light incident surface so that said light from said information source, after passing through said light incident surface, is reflected at said light reflective optical element and then emerges from said light exit surface to enter into said pentagonal prism through said transparent part.

9. In a single lens reflex camera as in claim 3, wherein said pentagonal prism includes an upper front surface, a front reflecting surface and a lower light incident surface and said holder includes a portion extending along said front reflecting surface and said lower light incident surface, said optical system further includes a reflecting mirror for reflecting said light from said information source to said upper front surface, a part of said upper front surface being transparent to permit said light reflected by said reflecting mirror to enter into said pentagonal prism towards said lower light incident surface thereof, a part of said front reflecting surface being transparent, and said portion has a light incident surface on said lower light incident surface, said light reflecting optical element having a light exit surface on said transparent part of said front reflecting surface so that said light enters into said pentagonal prism after passing through said lower light incident surface and said light incident surface and is reflected at said light reflecting optical element and then emerges from said light exit surface to enter into said pentagonal prism again through said transparent part of said front reflecting surface.

10. In a single lens reflex camera as in claim 9, wherein said optical system further includes a light converging optical element, and said holder further includes another portion extending along said transparent part of said upper front surface and serving as said light converging optical element.

11. In a single lens reflex camera as in claim 1, further comprising a photographic information source disposed in said camera, wherein said auxiliary optical system is an optical system for introducing light from said information source to said pentagonal prism for indication of photographic information in the finder view field.

12. In a single lens reflex camera as in claim 11, wherein said pentagonal prism includes a front reflecting surface and a lower light incident surface and said holder includes a portion extending along said front reflecting surface and the lower light incident surface, said portion including a light incident surface, said light reflecting optical element, a light exit surface on said lower light incident surface so that said light from said information source after passing through said light incident surface is reflected at said light reflecting optical element and then emerges from said light exit surface to enter into said pentagonal prism through said lower light incident surface.

13. In a single lens reflex camera as in claim 11, wherein said pentagonal prism includes a rear light exit surface and a lower light incident surface and said holder includes a portion extending along said rear light exit surface and said lower light incident surface, said portion including a light exit surface on said lower light incident surface, said light reflecting optical element and a light incident surface so that said light from said information source is reflected at said light reflecting optical element and then emerges from said light exit surface to enter into said pentagonal prism through said lower light incident surface.

14. In a single lens reflex camera as in claim 1, wherein said pentagonal prism includes a lower light incident surface and a side surface and further comprising a photographic information source disposed on said lower light incident surface and a light source for illuminating said information source, wherein said auxiliary optical system is an optical system for introducing light from said light source to said information source for indication of photographic information in the finder view field, and said holder includes a portion extending along said side surface and the lower light incident surface, said portion including a light incident surface, said light reflecting optical element and a light exit surface on said information source so that said light from said light source after passing through said light incident surface is reflected at said light reflecting optical element and then emerges from said light exit surface to enter into said pentagonal prism through said lower light incident surface.

* * * * *